(12) United States Patent
Lee et al.

(10) Patent No.: US 11,435,231 B2
(45) Date of Patent: Sep. 6, 2022

(54) VISION INSPECTION APPARATUS AND A METHOD OF DRIVING THE SAME

(71) Applicant: Samsung Display Co., Ltd., Yongin-si (KR)

(72) Inventors: Juneyoung Lee, Seoul (KR); Hoi Sik Moon, Hwaseong-si (KR); Hyungwoo Yim, Hwaseong-si (KR); Jae-Seob Chung, Asan-si (KR); Minyup Chae, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 98 days.

(21) Appl. No.: 16/701,409

(22) Filed: Dec. 3, 2019

(65) Prior Publication Data
US 2021/0102843 A1   Apr. 8, 2021

(30) Foreign Application Priority Data

Dec. 14, 2018   (KR) .......................... 10-2018-0161531

(51) Int. Cl.
*G09G 3/00*      (2006.01)
*G01J 3/50*      (2006.01)
(Continued)

(52) U.S. Cl.
CPC ............. *G01J 3/506* (2013.01); *G01J 1/4209* (2013.01); *G01J 1/4214* (2013.01); *G01J 3/465* (2013.01); *G01M 11/0264* (2013.01); *G09G 3/006* (2013.01); *G09G 3/36* (2013.01); *H04N 5/353* (2013.01); *H04N 5/372* (2013.01);
(Continued)

(58) Field of Classification Search
CPC ......... G09G 3/006; G09G 2330/08–12; G09G 3/36; G09G 2320/0233; H04N 5/353; H04N 5/372; H04N 9/0451; G02F 1/1309; G02F 2203/30
See application file for complete search history.

(56) References Cited

U.S. PATENT DOCUMENTS 5,105,264 A * 4/1992 Erhardt ................ H04N 5/3537
                                                         257/241
2004/0213449 A1* 10/2004 Safaee-Rad ........... G06T 7/0004
                                                         382/141
(Continued)

FOREIGN PATENT DOCUMENTS

KR   10-2016-0011300 A   2/2016
KR   10-2016-0061541 A   6/2016
KR   10-2017-0002770 A   1/2017

*Primary Examiner* — Sanghyuk Park
(74) *Attorney, Agent, or Firm* — Lewis Roca Rothgerber Christie LLP

(57) ABSTRACT

A vision inspection apparatus includes an inspection controller which displays a grid pattern with a plurality of gray levels on a display panel, an imaging converter which drives a charge-coupled device with a predetermined or set exposure-time and converts the grid pattern displayed on the display panel into a grid pattern signal, a charge calculator which calculates a charge amount per unit time for each color of a reference gray level using a reference gray level signal, included in the grid pattern signal, and the set exposure-time, and an exposure-time calculator which calculates an optimum exposure-time for each color of the reference gray level based on a target charge amount of the reference gray level.

20 Claims, 5 Drawing Sheets

(51) Int. Cl.
*G01J 1/42* (2006.01)
*G09G 3/36* (2006.01)
*G01J 3/46* (2006.01)
*G01M 11/02* (2006.01)
*H04N 5/372* (2011.01)
*H04N 9/04* (2006.01)
*H04N 5/353* (2011.01)
*G02F 1/13* (2006.01)

(52) U.S. Cl.
CPC ......... *H04N 9/0451* (2018.08); *G02F 1/1309* (2013.01); *G02F 2203/30* (2013.01); *G09G 2320/0233* (2013.01); *G09G 2320/0242* (2013.01)

(56) References Cited

U.S. PATENT DOCUMENTS

2007/0177230 A1* 8/2007 Kreysar ............... H04N 1/6033
358/1.9
2015/0194105 A1* 7/2015 Han ..................... G09G 3/3648
345/89
2017/0126947 A1* 5/2017 Hong .................. H04N 5/2621

* cited by examiner

VISION INSPECTION APPARATUS AND A METHOD OF DRIVING THE SAME

CROSS-REFERENCE TO RELATED APPLICATION

This application claims priority to and the benefit of Korean Patent Application No. 10-2018-0161531, filed on Dec. 14, 2018, which is hereby incorporated by reference for all purposes as if fully set forth herein.

BACKGROUND

1. Field

The technical field relates to an inspection apparatus for defect inspection of a display panel and a method of driving the inspection apparatus.

2. Description of the Related Art

In general, a display panel (e.g., a display cell) for a liquid crystal display includes a lower substrate, an upper substrate facing the lower substrate, and a liquid crystal layer interposed between the lower substrate and the upper substrate. The lower substrate has a pixel area and a peripheral area to which a driving signal for driving the pixel area is applied.

The pixel area includes a data line extending in a first direction and a gate line extending in a second direction and crossing the data line and a pixel electrode connected to the gate line and the data line. The peripheral area includes a first driving chip pad on which a driving chip for providing a data signal is mounted, and a second driving chip pad on which a driving chip for providing the gate signal is mounted.

After performing a liquid crystal injection process, the display panel performs a vision inspection process for checking the electrical and optical operation states. The vision inspection process includes a mura correction process for correcting a mura (e.g., a mura effect) of the display panel.

The vision inspection process generally converts a reference gray level (e.g., a reference gray or gray level of a grayscale) displayed on the display panel to an electrical signal through an industrial CCD (Charge-Coupled Device) camera. The CCD camera converts a reference gray level exposed to a charge-coupled device into an electrical signal. The vision inspection process uses the reference gray level signal to calculate a correction value for correcting a vision defect of a display panel such as a mura.

Recently, due to process dispersion (or manufacturing disparity) by a high resolution display and a pixel structure manufactured at a reduced cost, a luminance scattering is relatively large in a low gray level region. Therefore, a charge amount of the charge-coupled device varies with respect to the same exposure-time. For example, when the charge amount of the charge-coupled device is insufficient, a display defect such as a mura may occur, and when the charge amount of the charge-coupled device is excessive, a saturation defect occurs.

SUMMARY

Aspects of embodiments of the inventive concept are directed toward a vision inspection apparatus (e.g., a vision defect or bending defect inspection apparatus) for obtaining an adaptive inspection signal according to a display panel. Aspects of embodiments of the inventive concept are directed toward a method of driving the vision inspection apparatus.

According to an embodiment of the inventive concept, there is provided a vision inspection apparatus including an inspection controller which displays a grid pattern with a plurality of gray levels on a display panel, an imaging converter which drives a charge-coupled device with a predetermined or set exposure-time and converts the grid pattern displayed on the display panel into a grid pattern signal, a charge calculator which calculates a charge amount per unit time for each color of a reference gray level using a reference gray level signal, included in the grid pattern signal, and the set exposure-time and an exposure-time calculator which calculates an optimum exposure-time for each color of the reference gray level based on a target charge amount of the reference gray level.

In an embodiment, the plurality of gray levels may include a low-gray level and a full-gray level.

In an embodiment, when the reference gray level is displayed on the display panel, the charge-coupled device may be configured to be driven based on the optimum exposure-time for each color of the reference gray level that is less than a threshold exposure-time.

In an embodiment, when the reference gray level is displayed on the display panel, the charge-coupled device may be configured to be driven based on a green optimum exposure-time of the reference gray level that is less than a threshold exposure-time.

In an embodiment, the inspection controller may be configured to determine a display area of the display panel using the grid pattern.

In an embodiment, the vision inspection apparatus may further include a tri-stimulus value calculator which calculates color tri-stimulus values of the full-gray level using a full-gray level color signal, included in the grid pattern signal, and calculates tri-stimulus values of the reference gray level using a reference gray level signal included in the grid pattern signal, and a color-luminance value calculator which calculates a luminance value for each color of the reference gray level using color tri-stimulus values of the full-gray level and tri-stimulus values of the reference gray level.

In an embodiment, the charge calculator may be configured to calculate a charge amount per unit time for each color of the reference gray level using the luminance value for each color of the reference gray level and the set exposure-time.

In an embodiment, the vision inspection apparatus may further include an inspection corrector which calculates a correction value for correcting a vision defect of the display panel using the reference gray level signal based on the optimum exposure-time for each color of the reference gray level.

In an embodiment, the inspection corrector may be configured to calculate a mura correction value for correcting a mura of the display panel.

In an embodiment, the inspection corrector may be configured to calculate a color correction value for image quality correction of the display panel.

According to an embodiment of the inventive concept, there is provided a method of driving a vision inspection apparatus, the method including displaying a grid pattern with a plurality of gray levels on a display panel, driving a charge-coupled device with a predetermined or set exposure-time, converting the grid pattern displayed on the display panel into a grid pattern signal, calculating a charge amount per unit time for each color of a reference gray level using a reference gray level signal, included in the grid pattern signal, and the set exposure-time and calculating an optimum exposure-time for each color of the reference gray level based on a target charge amount of the reference gray level.

In an embodiment, the plurality of gray levels may include a low-gray level and a full-gray level.

In an embodiment, the method may further include driving the charge-coupled device based on the optimum exposure-time for each color of the reference gray level that is less than a threshold exposure-time, when the reference gray level is displayed on the display panel.

In an embodiment, the method may further include driving the charge-coupled device based on a green optimum exposure-time of the reference gray level that is less than a threshold exposure-time, when the reference gray level is displayed on the display panel.

In an embodiment, the method may further include determining a display area of the display panel using the grid pattern.

In an embodiment, the method may further include calculating color tri-stimulus values of the full-gray level using a full-gray level color signal, included in the grid pattern signal, and calculating tri-stimulus values of a reference gray level using a reference gray level signal, included in the grid pattern signal, and calculating a luminance value for each color of the reference gray level using color tri-stimulus values of the full-gray level and tri-stimulus values of the reference gray level.

In an embodiment, the method may further include calculating a charge amount per unit time for each color of the reference gray level using the luminance value for each color of the reference gray level and the set exposure-time.

In an embodiment, the method may further include calculating a correction value for correcting a vision defect of the display panel using the reference gray level signal based on the optimum exposure-time for each color of the reference gray level.

In an embodiment, the method may further include calculating a mura correction value for correcting a mura of the display panel.

In an embodiment, the method may further include calculating a color correction value for correcting an image quality of the display panel.

According to the embodiments, the vision inspection apparatus calculates an optimum exposure-time for obtaining a maximum charge amount for each gray level for the display panel. Therefore, the vision inspection apparatus may obtain an accurate reference gray level signal for the reference gray level displayed on the display panel. Accordingly, inspection correction values of the display panel may be accurately calculated.

In addition, the vision inspection apparatus may obtain the optimum exposure-time of the charge-coupled device adaptively to the optical characteristics of the display panel irrespective of the luminance dispersion or the transmittance characteristics of the display panel. The vision inspection apparatus may prevent or protect from a saturation defect due to an increase of the exposure-time and a decrease of the correction accuracy due to a lack of the exposure-time.

BRIEF DESCRIPTION OF THE DRAWINGS

The above and other features and advantages of the inventive concept will become more apparent from description of detailed embodiments thereof with reference to the accompanying drawings, in which.

DETAILED DESCRIPTION

Hereinafter, the inventive concept will be explained in more detail with reference to the accompanying drawings.

Figure 1:
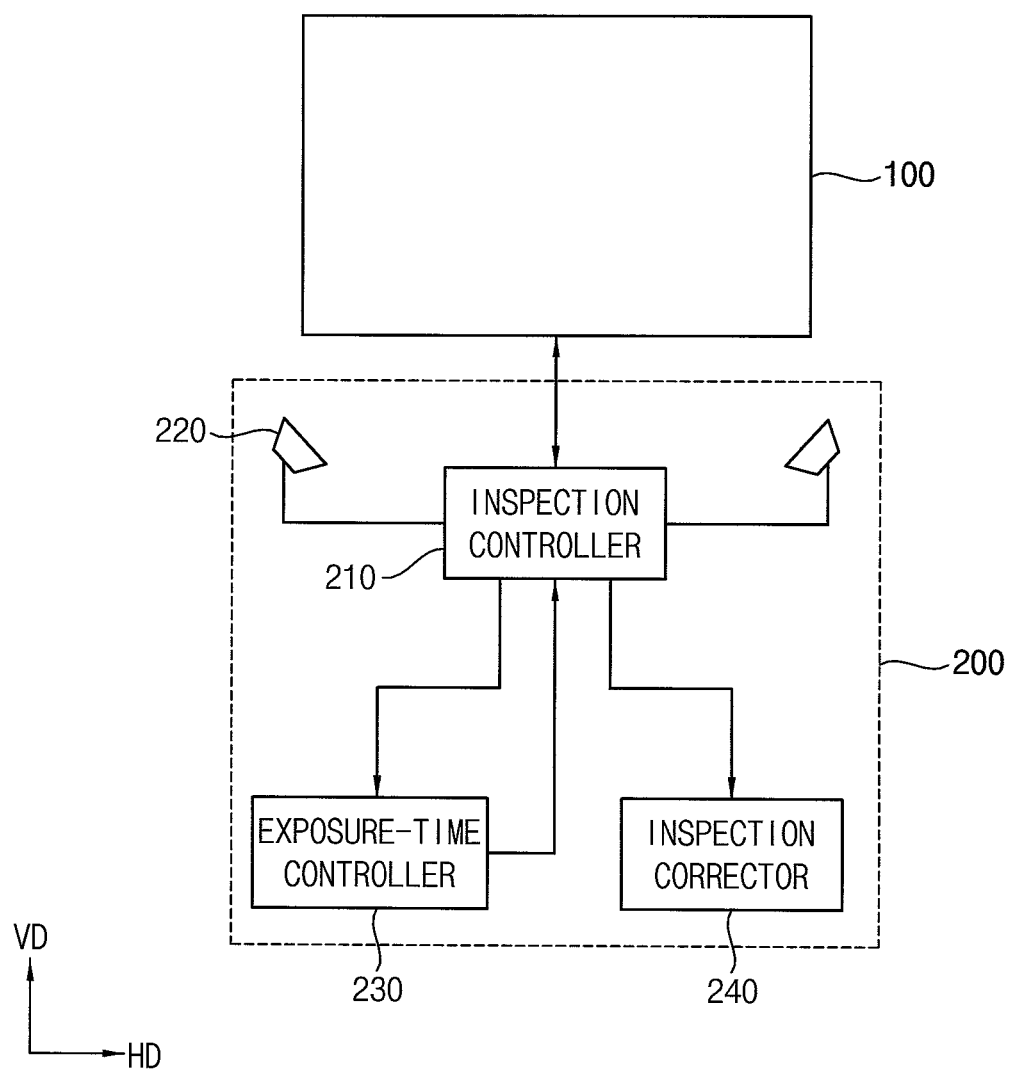
FIG. 1 is a schematic block diagram illustrating a vision inspection apparatus according to an embodiment.

FIG. 1 is a schematic block diagram illustrating a vision inspection apparatus according to an embodiment.

Referring to FIG. 1, the vision inspection system includes a display panel 100 for inspection and a vision inspection apparatus 200 for inspecting the display panel 100.

The vision inspection apparatus 200 includes an inspection controller 210, an imaging converter 220, an exposure-time controller 230, and an inspection corrector 240.

The inspection controller 210 controls overall operation of the vision inspection apparatus 200.

The inspection controller 210 may display a plurality of reference gray levels on the display panel 100.

The plurality of reference gray levels may include a 255-gray level, a 192-gray level, a 128-gray level, a 96-gray level, a 64-gray level, a 32-gray level, a 24-gray level, a 16-gray level, and a 0-gray level among the total 255 gray levels of a grayscale, for example, but is not limited thereto.

The inspection controller 210 may control an operation of the imaging converter 220 based on an exposure-time of each color with respect to each of the plurality of reference gray levels provided from the exposure-time controller 230.

The imaging converter 220 may be a CCD camera including a charge-coupled device (CCD).

Here, in one or more embodiments, the imaging converter 220 is charged with a light intensity of the reference gray level displayed on the display panel 100 exposed to the charge-coupled device of the imaging converter 220, and it converts the light intensity charged into the charge-coupled device into a digital signal.

For example, the charge-coupled device may include a color filter (which recognizes a color) and a color sensor (which measures a charged light intensity) and converts the charged light intensity into a digital signal. The charge-coupled device may include red, green, and blue sensors arranged in a mosaic manner, and the red, green, and blue sensors may each convert an incident light into a digital signal.

The exposure-time controller 230 may calculate the optimum exposure-time at which the charge-coupled device is exposed to a light for each color of the reference gray level.

The inspection controller 210 may display the plurality of reference gray levels on the display panel 100 to perform a vision inspection process of the display panel 100.

The exposure-time controller 230 calculates a charge amount per unit time (msec) of the charge-coupled device for each color of the reference gray level. The exposure-time controller 230 calculates an optimal exposure-time for each color of the reference gray level. The optimum exposure-time is an exposure-time for charging a target charge amount of the charge-coupled device.

The exposure-time controller 230 may provide the inspection controller 210 with the optimal exposure-time for each color of the reference gray level calculated with respect to each of the plurality of reference gray levels.

The inspection corrector 240 may calculate a correction value for correcting a display defect according to optical characteristic deviations of display panels by model characteristics such as process characteristics, structural characteristics, and the like of the display panel 100.

The inspection corrector 240 may calculate a mura correction value for correcting a mura of the display panel 100.

For example, the inspection corrector 240 may analyze the plurality of reference gray level images displayed on the display panel 100 to calculate a vertical luminance profile and a horizontal luminance profile. The inspection corrector 240 may calculate a correction value for correcting the horizontal line mura and the vertical line mura of the display panel 100 using the vertical luminance profile and the horizontal luminance profile.

In addition, the inspection corrector 240 may calculate a gamma correction value for correcting a gamma characteristic of the display panel 100.

For example, the inspection corrector 240 may analyze the plurality of reference gray level images displayed on the display panel 100 to generate a horizontal or vertical luminance profile. The inspection corrector 240 may generate a gamma curve corresponding to a central area of the display panel 100 using the horizontal or vertical luminance profile. The inspection corrector 240 may calculate a gamma correction value based on the target gamma curve.

In addition, the inspection corrector 240 may calculate a color correction value for correcting a color image quality of the display panel 100.

For example, the inspection corrector 240 may calculate a color correction value for a color image correction by analyzing a mixed color gray level displayed on the display panel 100.

Figure 2:
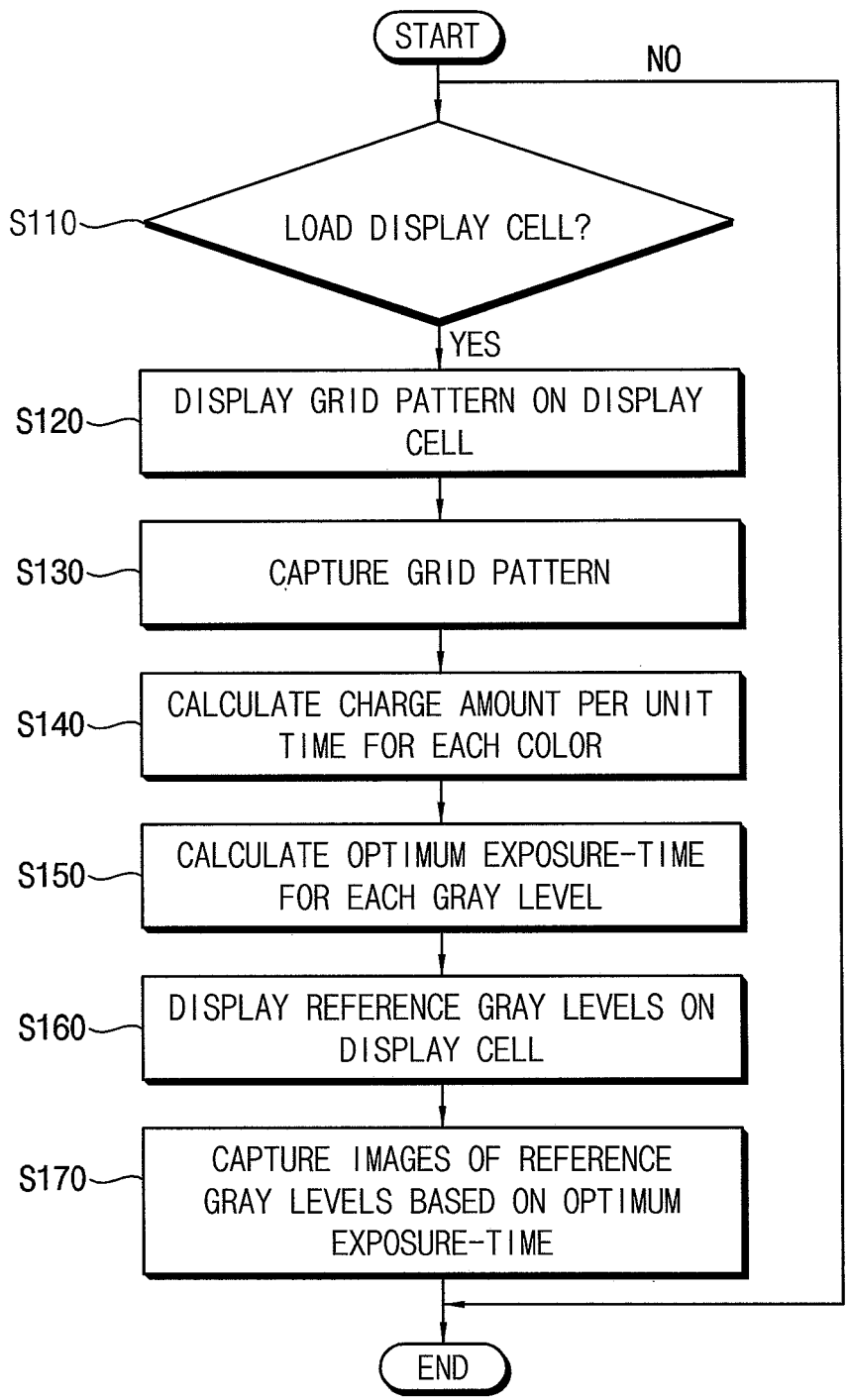
FIG. 2 is a schematic flowchart diagram illustrating a method of driving a vision inspection apparatus according to an embodiment.
Figure 3:
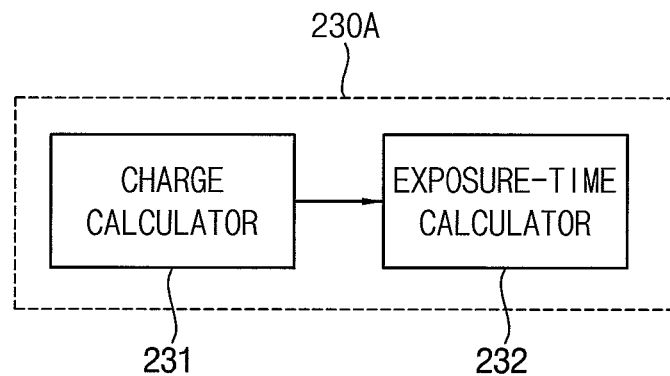
FIG. 3 is a schematic block diagram illustrating an exposure-time controller of a vision inspection apparatus according to an embodiment.
Figure 4:
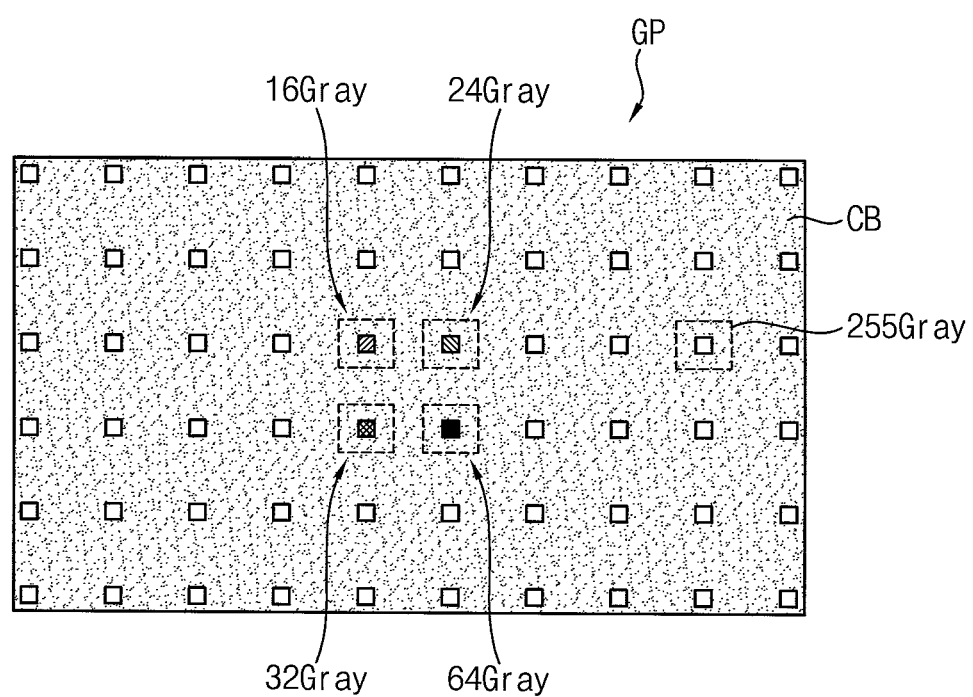
FIG. 4 is a conceptual diagram illustrating a grid pattern according to an embodiment.

FIG. 2 is a schematic flowchart diagram illustrating a method of driving a vision inspection apparatus according to an embodiment. FIG. 3 is a schematic block diagram illustrating an exposure-time controller of a vision inspection apparatus according to an embodiment. FIG. 4 is a conceptual diagram illustrating a grid pattern according to an embodiment.

Referring to FIGS. 1, 2, and 3, the display panel 100 for a vision inspection process is loaded into a vision inspection apparatus (Act S110).

When the display panel 100 is prepared, the inspection controller 210 first determines a display area of the display panel 100.

The inspection controller 210 displays a grid pattern on the display panel 100 to determine a display area of the display panel 100 (Act S120).

Referring to FIG. 4, the grid pattern GP may include a plurality of cubic blobs (e.g., a plurality of cube drop patterns) CB.

For example, the plurality of cube drop patterns CB may include information on a plurality of gray levels (e.g., grays). The plurality of gray levels may include a full-gray level and a plurality of reference gray levels. The full-gray level may include a 255-gray level (255Gray), and the reference gray levels may include a 16-gray level (16Gray), a 24-gray level (24Gray), a 32-gray level (32Gray), and a 64-gray level (64Gray), which are low gray levels relative to the full-gray level.

The inspection controller 210 controls the imaging converter 220 to capture the grid pattern GP displayed on the display panel 100 (Act S130).

The charge-coupled device of the imaging converter 220 is driven for a predetermined exposure-time (e.g., a set exposure-time) to convert the grid pattern GP displayed on the display panel 100 into a grid pattern signal as an electric signal.

The inspection controller 210 may determine a display area of the display panel 100 based on the grid pattern signal provided from the imaging converter 220.

In addition, the inspection controller 210 may calculate an optimum exposure-time for each color of the reference gray level using a plurality of reference gray level signals included in the grid pattern signal.

Referring to FIG. 3, the exposure-time controller 230A includes a charge calculator 231 and an exposure-time calculator 232.

The charge calculator 231 calculates the charge amount per unit time for each color of the reference gray level by using a plurality of reference gray level signals, for example, a 16-gray level signal, a 24-gray level signal, a 32-gray level signal, and a 64-gray level signal, included in the grid pattern signal, (Act S140).

The charge-coupled device of the imaging converter 220 may charge red, green, and blue lights of the reference gray level n_Gray by red, green, and blue filters and red, green, and blue sensors during the setup or predetermined exposure-time ET_REF.

The charge calculator 231 divides red, green, and blue charge amounts $R\_CCD\_n$, $G\_CCD\_n$, and $B\_CCD\_n$ of the reference gray level n_Gray by the predetermined exposure-time ET_REF to respectively calculate red, green, and blue charge amounts $R\_CCD\_ET\_n$, $G\_CCD\_ET\_n$, and $B\_CCD\_ET\_n$ per unit time of the reference gray level n_Gray.

The red, green, and blue charge amounts $R\_CCD\_ET\_n$, $G\_CCD\_ET\_n$, and $B\_CCD\_ET\_n$ per unit time of the reference gray level n_Gray may be defined as the following Equation 1:

$$R\_CCD\_Et\_n = R\_CCD\_n/ET\_REF$$

$$G\_CCD\_Et\_n = G\_CCD\_n/ET\_REF$$

$$B\_CCD\_Et\_n = B\_CCD\_n/ET\_REF \qquad \text{Equation 1}$$

The exposure-time calculator 232 calculates an optimum exposure-time for each gray level based on the target charge amount Target_CCD for each set or predetermined gray level according to the characteristics of each display panel (Act S150).

Table 1 shows the target charge amount Target_CCD for each gray level for the display panel 100 according to an embodiment.

TABLE 1

| 16Gray | Target CCD |
|---|---|
| 16 | 500 |
| 24 | 500 |
| 32 | 500 |
| 64 | 1000 |

TABLE 1-continued

| 16Gray | Target CCD |
|--------|------------|
| 96     | 2000       |
| 128    | 2000       |
| 192    | 2000       |
| 255    | 2000       |

The red, green, and blue optimum exposure-times R_ET_FINE_n, G_ET_FINE_n, and B_ET_FINE_n of the reference gray level n_Gray may be defined as the following Equation 2:

$$R\_ET\_Fine\_n = Target\_CCD\_n / R\_CCD\_ER\_n$$

$$G\_ET\_Fine\_n = Target\_CCD\_n / G\_CCD\_ER\_n$$

$$B\_ET\_Fine\_n = Target\_CCD\_n / B\_CCD\_ER\_n \quad \text{Equation 2}$$

The exposure-time calculator 232 calculates red, green, and blue optimum exposure-times R_ET_FINE_n, G_ET_FINE_n, and B_ET_FINE_n of the reference gray level n_Gray.

The exposure-time calculator 232 may provide the inspection controller 210 with red, green, and blue optimum exposure-times for each of the plurality of reference gray levels.

In the process of calculating the inspection correction value, the inspection controller 210 may control the driving time of the charge-coupled device using red, green, and blue optimum exposure-times R_ET_FINE_n, G_ET_FINE_n, and B_ET_FINE_n of the reference gray level n_Gray.

The inspection controller 210 displays the plurality of reference gray levels on the display panel 100 (Act S160).

The imaging converter 220 captures images respectively corresponding to the plurality of reference gray levels displayed on the display panel 100 (Act S170).

When the images of the plurality of reference gray levels (for example, a 16-gray level, a 24-gray level, a 32-gray level, and a 64-gray level) are captured, the imaging converter 220 may drive the charge-coupled device based on the red, green, and blue optimum exposure-times R_ET_FINE_n, G_ET_FINE_n, and B_ET_FINE_n of the reference gray level n_Gray calculated from the exposure-time controller 230A.

For example, the inspection controller 210 may control an operation of the charge-coupled device based on the green optimum exposure-time G_ET_FINE_n corresponding to the green having the highest luminance among the red, green, and blue optimum exposure-times R_ET_FINE_n, G_ET_FINE_n, and B_ET_FINE_n of the reference gray level n_Gray.

However, when the green optimum exposure-time G_ET_FINE_n is greater than the threshold exposure-time ET_MAX_n of the charge-coupled device, the inspection controller 210 may control an operation of the charge-coupled device based on an optimum exposure-time (selected from red and blue optimum exposure-times R_ET_FINE_n and B_ET_FINE_n) that is less than and closer to the threshold exposure-time ET_MAX_n.

As described above, the inspection controller 210 may control the operation of the imaging converter 220 at an optimum exposure-time respectively corresponding to the plurality of reference gray levels.

Therefore, by calculating the optimum exposure-time for obtaining the maximum charge amount for each gray level, the reference gray level signal may be accurately obtained for the reference gray level displayed on the display panel. Accordingly, the correction value of the display panel may be accurately calculated.

Figure 5:
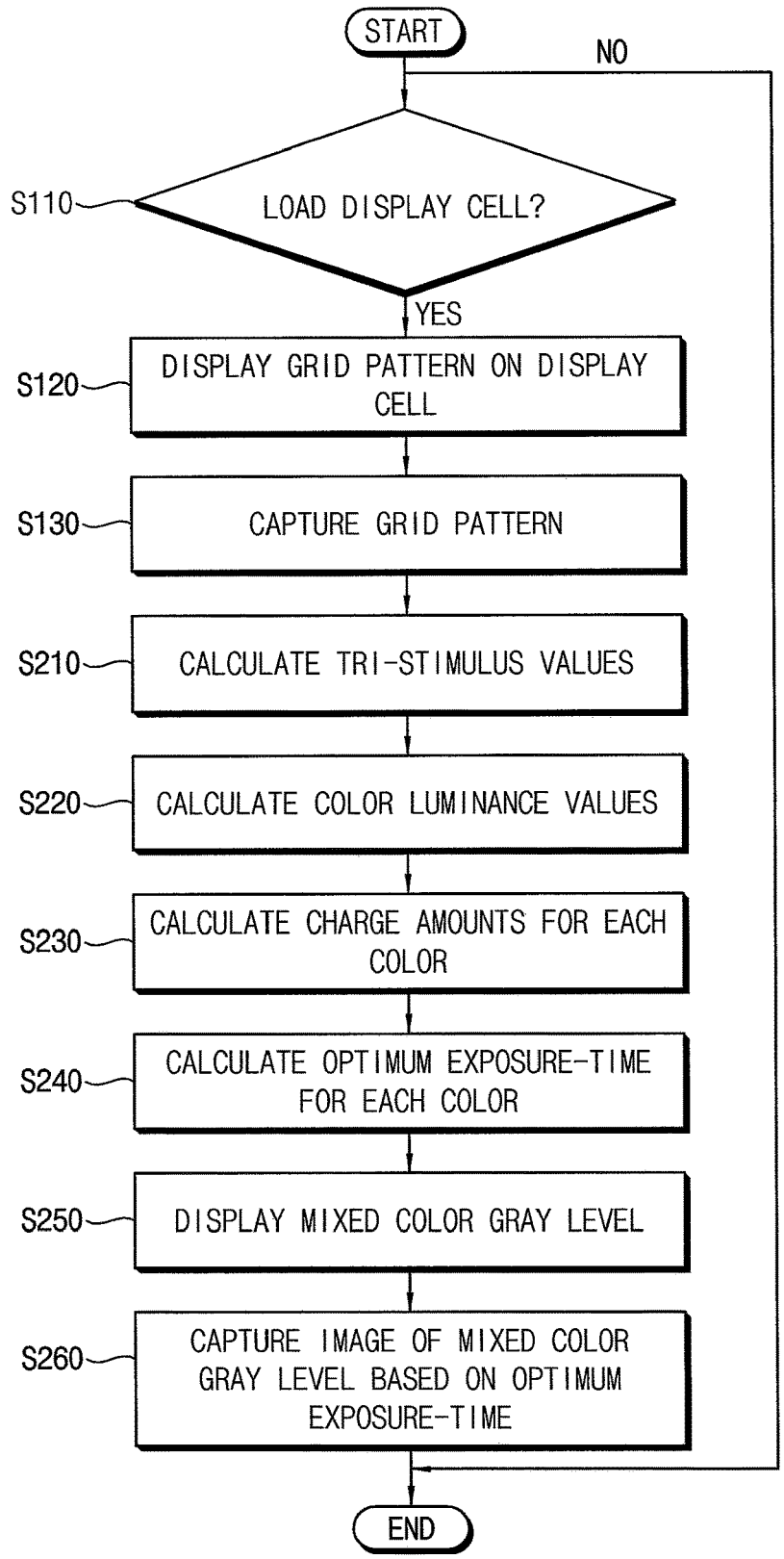
FIG. 5 is a schematic flowchart diagram illustrating a method of driving a vision inspection apparatus according to an embodiment.
Figure 6:
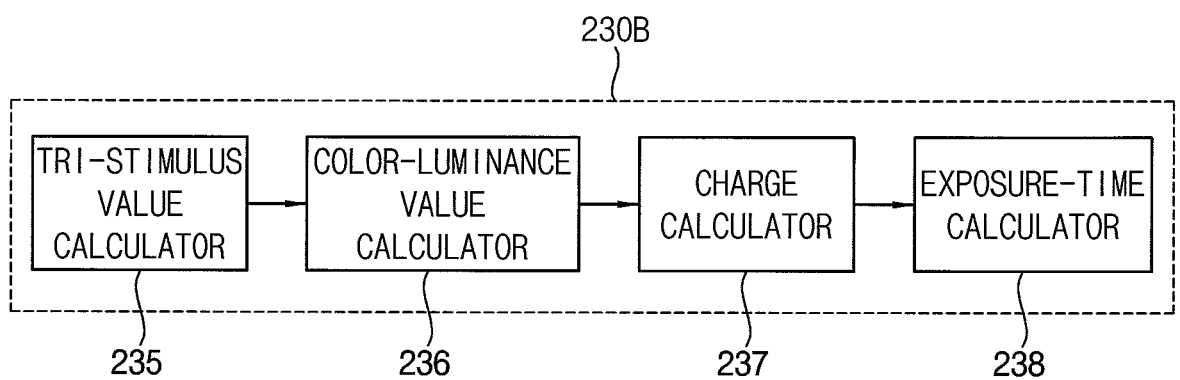
FIG. 6 is a schematic block diagram illustrating an exposure-time controller of a vision inspection apparatus according to an embodiment.

FIG. 5 is a schematic flowchart diagram illustrating a method of driving a vision inspection apparatus according to an embodiment. FIG. 6 is a schematic block diagram illustrating an exposure-time controller of a vision inspection apparatus according to an embodiment.

Referring to FIGS. 1 and 5, the display panel 100 for a vision inspection process is loaded into a vision inspection apparatus (Act S110). When the display panel 100 is prepared, the inspection controller 210 first determines a display area of the display panel 100.

The inspection controller 210 displays a grid pattern on the display panel 100 to determine a display area of the display panel 100 (Act S120).

Referring to FIG. 4, the grid pattern GP may include a plurality of cubic blobs (e.g., a plurality of cube drop patterns) CB.

For example, the plurality of cube drop patterns CB may include information on a plurality of gray levels.

The plurality of gray levels may include a full-gray level and a plurality reference gray levels. The full-gray level may include a 255-gray level, and the reference gray levels may include a 16-gray level, a 24-gray level, a 32-gray level, and a 64-gray level, which are low gray levels.

The inspection controller 210 controls the imaging converter 220 to capture the grid pattern GP displayed on the display panel 100 (Act S130).

The charge-coupled device of the imaging converter 220 is driven for a set or predetermined exposure-time ET REF to convert the grid pattern GP displayed on the display panel 100 into a grid pattern signal as an electric signal.

The inspection controller 210 may determine a display area of the display panel 100 based on the grid pattern signal provided from the imaging converter 220.

Referring to FIG. 6, the exposure-time controller 230B includes a tri-stimulus value calculator 235, a color-luminance value calculator 236, a charge calculator 237, and an exposure-time calculator 238.

The tri-stimulus value calculator 235 may calculate red tri-stimulus values $X_{Red\_255}$, $Y_{Red\_255}$, and $Z_{Red\_255}$ of the full-gray level using the red signal of the full-gray level included in the grid pattern signal; green tri-stimulus values $X_{Green\_255}$, $Y_{Green\_255}$, and $Z_{Green\_255}$ of the full-gray level using the green signal of the full-gray level included in the grid pattern signal; and blue tri-stimulus values $X_{Blue\_255}$, $Y_{Blue\_255}$, and $Z_{Blue\_255}$ of the full-gray level using the blue signal of the full-gray level included in the grid pattern signal.

In addition, the tri-stimulus value calculator 235 may calculate tri-stimulus values $X_{Gray\_n}$, $Y_{Gray\_n}$, and $Z_{Gray\_n}$ of an n-gray level using an n-gray level signal, for example, a 16-gray level signal, a 24-gray level signal, a 32-gray level signal, and a 64-gray level signal that are signals of the plurality of reference gray levels, included in the grid pattern signal, (Act S210).

The color-luminance value calculator 236 calculates red tri-stimulus values, green tri-stimulus values, and blue tri-stimulus values of the reference gray level n_Gray using the RGB algorithm based on characteristics of the display panel 100 (e.g., characteristics of an LCD panel).

The RGB algorithm may include calculating red, green, and blue color coordinates of the reference gray level using a representative function of differences between a color coordinate corresponding to the full-gray level and the color coordinate corresponding to the reference gray level with respect to a transmittance of the LCD panel. In CIE 1931 color space, the tri-stimulus values (X, Y, Z) may be transformed into color coordinates (x, y) and luminance values (Y), and the red, green, and blue color luminance values of the reference gray level are calculated (Act S220).

The red color coordinates ($x_{Red\_n}$, $y_{Red\_n}$) of the reference gray level n_Gray may be defined as the following Equation 3:

$$x_{Red\_n} = x_{Red\_255} - (x_{Red\_255} - x_{Red\_n})$$

$$y_{Red\_n} = y_{Red\_255} - (y_{Red\_255} - y_{Red\_n})$$

$$x_{Green\_n} = x_{Green\_255} - (x_{Green\_255} - x_{Green\_n})$$

$$y_{Green\_n} = y_{Green\_255} - (y_{Green\_255} - y_{Green\_n})$$

$$x_{Blue\_n} = x_{Blue\_255} - (x_{Blue\_255} - x_{Blue\_n})$$

$$y_{Blue\_n} = y_{Blue\_255} - (y_{Blue\_255} - y_{Blue\_n}) \quad \text{Equation 3}$$

Green color coordinates ($x_{Green\_n}$, $y_{Green\_n}$) and blue color coordinates ($x_{Blue\_n}$, $y_{Blue\_n}$) of the reference gray level n_Gray may be calculated in the same manner as Equation 3.

Red, green, and blue tri-stimulus values (X, Y, Z) may be changed into each of red, green, and blue color coordinates (x, y), and a luminance value Y, using a relational equation of the color coordinates (x, y) and the tri-stimulus values (X, Y, Z) in CIE 1931 color space as in the following Equation 4:

$$X = \frac{X}{Y} \times Y = \frac{x}{y} \times Y \quad \text{Equation 4}$$

$$Z = \frac{Z}{Y} \times Y = \frac{z}{y} \times Y$$

The tri-stimulus values ($X_{Gray\_n}$, $Y_{Gray\_n}$, $Z_{Gray\_n}$) of the reference gray level n_Gray may be defined as a sum of the red, green, and blue tri-stimulus values ($X_{Red\_n}$, $Y_{Red\_n}$, $Z_{Red\_n}/X_{Green\_n}$, $Y_{Green\_n}$, $Z_{Green\_n}/X_{Blue\_n}$, $Y_{Blue\_n}$, $Z_{Blue\_n}$) of the reference gray level n_Gray. The following Equation 5 may be defined by Equation 4 and the sum of the red, green, and blue tri-stimulus values ($X_{Red\_n}$, $Y_{Red\_n}$, $Z_{Red\_n}/X_{Green\_n}$, $Y_{Green\_n}$, $Z_{Green\_n}$ $X_{Blue\_n}$, $Y_{Blue\_n}$, $Z_{Blue\_n}$).

$$\begin{bmatrix} X_{Gray\_n} \\ Y_{Gray\_n} \\ Z_{Gray\_n} \end{bmatrix} = \begin{bmatrix} X_{Red\_n} + X_{Green\_n} + X_{Blue\_n} \\ Y_{Red\_n} + Y_{Green\_n} + Y_{Blue\_n} \\ Z_{Red\_n} + Z_{Green\_n} + Z_{Blue\_n} \end{bmatrix} = \quad \text{Equation 5}$$

$$\begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix} \begin{bmatrix} Y_{Red\_n} \\ Y_{Green\_n} \\ Y_{Blue\_n} \end{bmatrix}$$

When an inverse matrix is applied to a matrix equation of Equation 5, the red, green, and blue luminance values ($Y_{Red\_n}$, $Y_{Green\_n}$, $Y_{Blue\_n}$) of the reference gray level n_Gray may be calculated with the following Equation 6:

$$\begin{bmatrix} Y_{Red\_n} \\ Y_{Green\_n} \\ Y_{Blue\_n} \end{bmatrix} = \begin{bmatrix} \frac{x_{Red\_n}}{y_{Red\_n}} & \frac{x_{Green\_n}}{y_{Green\_n}} & \frac{x_{Blue\_n}}{y_{Blue\_n}} \\ 1 & 1 & 1 \\ \frac{z_{Red\_n}}{y_{Red\_n}} & \frac{z_{Green\_n}}{y_{Green\_n}} & \frac{z_{Blue\_n}}{y_{Blue\_n}} \end{bmatrix}^{-1} \begin{bmatrix} X_{Gray\_n} \\ Y_{Gray\_n} \\ Z_{Gray\_n} \end{bmatrix} \quad \text{Equation 6}$$

The red, green, and blue luminance values ($Y_{Red\_n}$, $Y_{Green\_n}$, $Y_{Blue\_n}$) of the reference gray level n_Gray calculated by the color-luminance value calculator 236 may correspond to the red, green, and blue charge amounts R_CCD_n, G_CCD_n, and B_CCD_n of the reference gray level n_Gray charged in the charge-coupled device during the predetermined exposure-time ET_REF.

The charge calculator 237 divides the red, green, and blue charge amounts R_CCD_n, G_CCD_n, and B_CCD_n of the reference gray level n_Gray by the predetermined exposure-time ET_REF. The charge calculator 237 calculates the charge amounts R_CCD_ET_n, G_CCD_ET_n, and B_CCD_ET_n per unit time for each color, for example, red, green, and blue of the reference gray level n_Gray (Act S230).

The charge amounts R_CCD_ET_n, G_CCD_ET_n, and B_CCD_ET_n may be defined as Equation 1 described above.

The exposure-time calculator 238 calculates the optimum exposure-time for each color of the reference gray level based on the target charge amount Target_CCD for a set or predetermined gray level according to the characteristics of each display panel (Act S240).

The red, green, and blue optimum exposure-times R_ET_FINE_n, G_ET_FINE_n, and B_ET_FINE_n of the reference gray level n_Gray may be defined as Equation 2 described above.

The exposure-time calculator 238 calculates red, green, and blue optimum exposure-times R_ET_FINE_n, G_ET_FINE_n, and B_ET_FINE_n of the reference gray level n_Gray.

The exposure-time calculator 238 may provide the inspection controller 210 with the red, green, and blue optimum exposure-times for each of the plurality of reference gray levels.

In the inspection correction process in which the inspection controller 210 calculates the inspection correction values, the operation of the imaging converter 220 may be controlled using red, green, and blue optimum exposure-times R_ET_FINE_n, G_ET_FINE_n, and B_ET_FINE_n of the reference gray level n_Gray.

The inspection controller 210 displays mixed color gray level on the display panel 100 (Act S250).

The imaging converter 220 may capture an image corresponding to the mixed color gray level displayed on the display panel 100 based on the optimum exposure-time for each color of the gray level (Act S260).

When the mixed color gray level includes a green with the highest luminance, the inspection controller 210 may drive the charge-coupled device based on a green optimum exposure-time of the mixed color gray level.

When the green optimum exposure-time of the mixed color gray level is greater than a threshold exposure-time ET_MAX_n at which the charge amount of the charge-coupled device saturates, the inspection controller 210 may drive the charge-coupled device based on an optimal exposure-time of another color that is less than the threshold exposure-time ET_MAX_n.

Alternatively, when the mixed color gray level includes a red and a blue without the green, the inspection controller 210 may drive the charge-coupled device based on a larger optimum exposure-time selected from the red optimum exposure-time and the blue optimum exposure-time of the mixed color gray level. For example, if the red optimum exposure-time is larger than the blue optimum exposure-time of the mixed color gray level, then the red optimum exposure-time is selected (and vice versa).

When the larger optimum exposure-time selected from the red optimum exposure-time and the blue optimum exposure-time of the mixed color gray level is greater than the threshold exposure-time ET_MAX_n, the inspection controller 210 may drive the charge-coupled device based on an optimal exposure-time of another color that is less than the threshold exposure-time ET_MAX_n.

As described above, the inspection controller 210 may control the imaging converter 220 at the optimum exposure-time for each color of the gray level included in the mixed color gray level.

Accordingly, the vision inspection apparatus calculates an optimum exposure-time for obtaining a maximum charge amount for each gray level for the display panel. Therefore, the vision inspection apparatus may obtain an accurate reference gray level signal for the reference gray level displayed on the display panel. Accordingly, inspection correction values of the display panel may be accurately calculated.

According to the embodiments, the transmittance characteristics are different due to a large gamma scattering of the display panel or the characteristics of a highly integrated display panel. Accordingly, the vision inspection apparatus may obtain the optimum exposure-time of the charge-coupled device adaptively to the optical characteristics of the display panel irrespective of the luminance dispersion or the transmittance characteristics of the display panel. The vision inspection apparatus may prevent or protect from both a saturation defect due to an increase of the exposure-time and a decrease of correction accuracy due to a lack of the exposure-time.

The present inventive concept may be applied to a display device and an electronic device having the display device. For example, the present inventive concept may be applied to a computer monitor, a laptop, a digital camera, a cellular phone, a smartphone, a smart pad, a television, a personal digital assistant (PDA), a portable multimedia player (PMP), an MP3 player, a navigation system, a game console, a video phone, etc.

The use of "may" when describing embodiments of the inventive concept refers to "one or more embodiments of the inventive concept."

As used herein, the terms "use," "using," and "used" may be considered synonymous with the terms "utilize," "utilizing," and "utilized," respectively.

The visual inspection apparatus and/or any other relevant devices or components according to embodiments of the present invention described herein may be implemented utilizing any suitable hardware, firmware (e.g., an application-specific integrated circuit), software, or a combination of software, firmware, and hardware. For example, the various components of the visual inspection apparatus may be formed on one integrated circuit (IC) chip or on separate IC chips. Further, the various components of the [device] may be implemented on a flexible printed circuit film, a tape carrier package (TCP), a printed circuit board (PCB), or formed on one substrate. Further, the various components of the visual inspection apparatus may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A vision inspection apparatus comprising:
   an inspection controller to display a grid pattern with a plurality of gray levels on a display panel;
   an imaging converter to drive a charge-coupled device with a set exposure-time and to convert the grid pattern displayed on the display panel into a grid pattern signal;
   a charge calculator to calculate a charge amount per unit time for each color of a reference gray level using a reference gray level signal, comprised in the grid pattern signal, and the set exposure-time; and
   an exposure-time calculator to calculate an optimum exposure-time for each color of the reference gray level based on a target charge amount of the reference gray level.

2. The vision inspection apparatus of claim 1, wherein the plurality of gray levels comprises a low-gray level and a full-gray level.

3. The vision inspection apparatus of claim 1, wherein when the reference gray level is displayed on the display panel, the charge-coupled device is configured to be driven based on the optimum exposure-time for each color of the reference gray level that is less than a threshold exposure-time.

4. The vision inspection apparatus of claim 1, wherein when the reference gray level is displayed on the display panel, the charge-coupled device is configured to be driven based on a green optimum exposure-time of the reference gray level that is less than a threshold exposure-time.

5. The vision inspection apparatus of claim 1, wherein the inspection controller is configured to determine a display area of the display panel using the grid pattern.

6. The vision inspection apparatus of claim 1, further comprising:
- a tri-stimulus value calculator to calculate color tri-stimulus values of the full-gray level using a full-gray level color signal, comprised in the grid pattern signal, and to calculate tri-stimulus values of the reference gray level using a reference gray level signal comprised in the grid pattern signal; and
- a color-luminance value calculator to calculate a luminance value for each color of the reference gray level using color tri-stimulus values of the full-gray level and tri-stimulus values of the reference gray level.

7. The vision inspection apparatus of claim 6, wherein the charge calculator is configured to calculate a charge amount per unit time for each color of the reference gray level using the luminance value for each color of the reference gray level and the set exposure-time.

8. The vision inspection apparatus of claim 1, further comprising:
- an inspection corrector to calculate a correction value for correcting a vision defect of the display panel using the reference gray level signal based on the optimum exposure-time for each color of the reference gray level.

9. The vision inspection apparatus of claim 8, wherein the inspection corrector is configured to calculate a mura correction value for correcting a mura of the display panel.

10. The vision inspection apparatus of claim 8, wherein the inspection corrector is configured to calculate a color correction value for image quality correction of the display panel.

11. A method of driving a vision inspection apparatus, the method comprising:
- displaying a grid pattern with a plurality of gray levels on a display panel;
- driving a charge-coupled device with a set exposure-time;
- converting the grid pattern displayed on the display panel into a grid pattern signal;
- calculating a charge amount per unit time for each color of a reference gray level using a reference gray level signal, comprised in the grid pattern signal, and the set exposure-time; and
- calculating an optimum exposure-time for each color of the reference gray level based on a target charge amount of the reference gray level.

12. The method of claim 11, wherein the plurality of gray levels comprises a low-gray level and a full-gray level.

13. The method of claim 11, further comprising:
- driving the charge-coupled device based on the optimum exposure-time for each color of the reference gray level that is less than a threshold exposure-time, when the reference gray level is displayed on the display panel.

14. The method of claim 11, further comprising:
- driving the charge-coupled device based on a green optimum exposure-time of the reference gray level that is less than a threshold exposure-time, when the reference gray level is displayed on the display panel.

15. The method of claim 11, further comprising:
- determining a display area of the display panel using the grid pattern.

16. The method of claim 11, further comprising:
- calculating color tri-stimulus values of the full-gray level using a full-gray level color signal, comprised in the grid pattern signal, and calculating tri-stimulus values of a reference gray level using a reference gray level signal comprised in the grid pattern signal; and
- calculating a luminance value for each color of the reference gray level using color tri-stimulus values of the full-gray level and tri-stimulus values of the reference gray level.

17. The method of claim 16, further comprising:
- calculating a charge amount per unit time for each color of the reference gray level using the luminance value for each color of the reference gray level and the set exposure-time.

18. The method of claim 16, further comprising:
- calculating a correction value for correcting a vision defect of the display panel using the reference gray level signal based on the optimum exposure-time for each color of the reference gray level.

19. The method of claim 18, further comprising:
- calculating a mura correction value for correcting a mura of the display panel.

20. The method of claim 18, further comprising:
- calculating a color correction value for correcting an image quality of the display panel.

* * * * *